United States Patent Office 3,793,417
Patented Feb. 19, 1974

3,793,417
NOVEL KETIMINE-CONTAINING COATING
COMPOSITIONS
J. Alden Erikson, Gibsonia, and William J. Birkmeyer, Oakmont, Pa., assignors to PPG Industries, Inc., Pittsburgh, Pa.
No Drawing. Filed June 12, 1972, Ser. No. 261,870
Int. Cl. C08g 22/18
U.S. Cl. 264—77.5 AM
19 Claims

ABSTRACT OF THE DISCLOSURE

Useful adducts can be prepared by reacting a diisocyanate with a diketimine or dialdimine. These adducts can be employed to provide polyketimines or polyaldimines by reacting the adduct with an organic active hydrogen-containing material. The polyketimines or polyaldimines provided may be employed as curing agents or may be cured with crosslinking agents to produce compositions that can be employed as coatings which have excellent appearance, tensile strength and extensibility.

BACKGROUND OF THE INVENTION

In the past it has been known that urethane propolymer coating compositions can be made from 1-isocyanato-3-isocyanatomethyl-3,5,5-trimethylcyclohexane and aliphatic polyols or water using a ratio of NCO groups to OH groups of at least 1.2:1 (U.S. Pat. No. 3,549,569). When such compositions are to be moisture-cured, the polyol preferably has as its major component an aliphatic polyol having a molecular weight of at least about 500. If the composition is polyol cured, the polyol used in making the prepolymer preferably has as its major component an aliphatic polyol having a molecular weight of up to about 200. Cured coatings made from such prepolymer compositions are said to have good resistance to the discoloring action of ultraviolet light rays in the presence of oxygen in the air.

Likewise, it is well known that polyurea polymers having unique properties can be prepared from certain polyisocyanates or combinations of polyisocyanates and certain derivatives of aldimines or ketimines (U.S. Pat. No. 3,493,543). The polyurea polymers are particularly valuable as coatings for various substrates.

DESCRIPTION OF THE INVENTION

It has now been discovered that adducts prepared by reacting a diisocyanate with a diketimine or dialdimine can be employed to provide polyketimines or polyaldimines by reacting the adducts with organic, active hydrogen-containing materials. These polyketimines or polyaldimines can readily be cured with crosslinking agents such as organic polyisocyanates to produce compositions that when employed as coatings provide films having excellent appearance, tensile strength and extensibility.

More particularly, the invention herein is directed to polyketimine and polyaldimine compositions and a method of making the same. These compositions are prepared by reacting a diisocyanate-ketimine or aldimine adduct with an organic active hydrogen-containing material.

The adducts herein are prepared by reacting a diisocyanate with reactive ketimine or aldimine in a molar ratio of from about 0.6 to 1.0 to about 3 to 2. These adducts are reacted with an organic active hydrogen-containing material, such as hydroxyl, carboxyl or amine-containing organic material, to provide the polyketimines or polyaldimines herein. The polyketimines or polyaldimines may be employed as curing agents for epoxide resins or they may be blended or admixed with crosslinking agents, such as organic polyisocyanates, to provide compositions that will cure by reaction with moisture at room temperature. When desirable such compositions may be cured in the presence of heat alone or in the presence of moisture and heat.

As mentioned above the adducts employed herein are prepared from a diisocyanate and a reactive ketimine.

The diisocyanate which is reacted with the ketimine or aldimine may be essentially any organic diisocyanate, such as a hydrocarbon diisocyanate or substituted hydrocarbon diisocyanate, an aromatic, aliphatic or cycloaliphatic diisocyanate, or a combination of these types. Representative compounds include 2,4-toluene diisocyanate, p-phenylene diisocyanate, 4-chloro-1, 3-phenylene diisocyanate, 4,4'-diphenylene diisocyanate, 1,5-naphthalene diisocyanate, 1,4-tetramethylene-diisocyanate, 1,6-hexamethylene diisocyanate, 1,10-decylmethylenediisocyanate, 1,4-cyclohexylene diisocyanate, 4,4'-methylenebis (cyclohexyl isocyanate) and 1,5-tetrahydronaphthylene diisocyanate. Compounds in which the two isocyanate groups differ in reactivity, such as 2,4-toluene diisocyanate, are particularly desirable, as is isophorone diisocyanate. The diisocyanate may contain other substituents, although those which are free from reactive groups other than the two isocyanate groups are ordinarily preferred. In the case of aromatic compounds, the isocyanate groups may be attached either to the same or to different rings.

Most diisocyanates generally have the formula

wherein $R_1$ is selected from the group consisting of arylene, such as p-phenylene diphenylene, and the like; alkarylene, such as toluene diphenylene, and the like; arylene such as dimethylbiphenylene, and the like; alkylene such as tetramethylene, hexamethylene, trimethylhexylene, and the like; aralkylene, such as methylenebisphenyl, dimethylmethylenebisphenylene; and alicyclic, such as isophorone, methylcyclohexylene, and the like.

The preferred diisocyanates for use in this invention are isophorone diisocyanate and 2,4-toluene diisocyanate.

The other component of the adducts herein is a reactive ketimine or aldimine.

For purposes of this invention it is preferred to employ a diketimine or a dialdimine having the general formula:

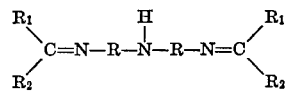

wherein R is an alkylene group of 2 to 6 carbon atoms, and $R_1$ and $R_2$ are hydrogen or organic radicals having from 1 to 8 carbon atoms, such as alkyl or aryl. Various of these diketimines and dialdimines are available commercially, such as diethylene triamine methyl isobutyl ketone diketimine. Generally, the diketimines or dialdimines are prepared by reacting an alkylene polyamine and a carbonyl compound having the structure:

wherein $R_1$ and $R_2$ are hydrogen or organic radicals substantially inert to the ketimine or aldimine formation reaction. It is preferred that one of these radicals be an organic group. Preferably, $R_1$ and $R_2$, when organic, are short chain alkyl groups (1 to 4 carbon atoms). Preferred examples of the carbonyl compounds include aldehydes and ketones, such as acetone, methyl ethyl ketone, methyl isobutyl ketone, methyl n-butyl ketone, ethyl isopropyl ketone, acetaldehyde, propionaldehyde, butyraldehyde, isobutyraldehyde, and the like.

The reaction between the diisocyanate and diketimine or dialdimine is generally quite fast and exothermic. Thus temperatures below 100° F. may be employed. A molar ratio between the diisocyanate and diketimine or dialdimine of 1:1 is preferred, however, a molar ratio from as low as 0.6:1 to as high as 3:2 may be employed. In preparing the adducts herein the reactions may be carried out in non-reactive solvent such as aromatic or aliphatic hydrocarbons and acetates. Specific examples include xylene, toluene, Cellosolve acetate and the like.

As previously mentioned these adducts can readily be reacted with an organic active hydrogen-containing material.

Generally the organic active hydrogen-containing material may be any compound which will react with the diisocyanate-diketimine or dialdimine adduct. By "active hydrogen" is meant hydrogens reactive with Zerewitinoff reagent. The types of functional groups containing active hydrogen are well known in the art and include monomers, polymers, and other compounds containing carboxyl, hydroxyl, amino, amido, N-hydroxyalkyl amido and N-alkoxyalkyl amido groups. However, for the purposes of this invention the preferred compounds include monoalcohols, polyols, hydroxyl or carboxyl-containing resinous materials, and amine resins.

Useful mono-alcohols include those having a hydrocarbon chain comprising from about 3 to about 18 carbon atoms; for example, primary, secondary and tertiary alcohols, such as methanol, ethanol, propanol, isopropanol, 1-butanol, 2-butanol, tert-butanol, 1-pentanol, 3-pentanol, tert-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol and the like.

Useful polyols include diols. Suitable diols include glycols of the formula $HO(CH_2)_nOH$, wherein $n$ equals 2 to 10, glycols of the formulae $HO(CH_2CH_2O)_nH$ and $HO[CH(CH_3)CH_2O]_nH$, in which $n$ equals 1 to 40, such as ethylene glycol, diethylene glycol, and the like, 2,2-dimethyl-1,3-propanediol, 2,2-diethyl-1,3-propanediol, 3-methyl-1,5-pentanediol, N-methyl and N-ethyl diethanolamines. Others include 4,4'-methylenebiscyclohexanol, 4,4'-isopropylidenebis-cyclohexanol and various xylenediols; hydroxymethylphenethyl alcohols; hydroxymethyl phenylpropanols; phenylene diethanols; phenylene dipropanols; and heterocyclic diols such as 1,4-piperazine diethanol and the like. Still other useful diols include 2-methyl-2-ethyl-1,3-propanediol, 2-ethyl-1,3-hexanediol and 2,2-dimethyl-3-hydroxypropyl - 2,2 - dimethyl-3-hydroxypropionate.

Aliphatic triols such as hexanetriol and polyether polyols prepared by the oxyalkylation of aliphatic triols, may be used in desirable quantities in this invention. The aliphatic triols which may be included as an additional reactive hydrogen component include aliphatic triols having 6 or more carbon atoms. Typical triols include the following: trimethylolethane, trimethylolpropane, glycerol, 2,2,6-hexanetriol and the like.

Useful tetrafunctional polyether polyols and polyether polyols include those of higher functionality prepared by the reaction of an alkylene oxide, such as ethylene oxide, propylene oxide or butylene oxide, with a polyol having 4 or more available hydroxyl groups. Typical tetrafunctional and higher functional polyether polyols are prepared by the oxyalkylation of polyols such as the following: pentaerythritol, sucrose, 2,2,6,6-tetrakis (hydroxymethyl)cyclohexanol, glucose, sorbitol, mannitol, degraded starches, degraded cellulose, diglycerol, α-methyl glucoside and the like. Such polyether polyols may be utilized in the present invention.

In addition to the aliphatic polyols and the polyether polyols, polyester resins containing hydroxyl groups may be utilized to prepare the compositions of the present invention. Suitable polyester resins may be prepared by reacting an excess of polyol with a polycarboxylic acid, especially dicarboxylic acids. Typical polyols include: ethylene glycol, propylene glycol, butylene glycol, glycerol, trimethylolpropane, trimethylolethane, 1,2,6-hexanetriol, pentaerythritol, diethylene glycol, dipropylene glycol, and the like. Typical dicarboxylic acids include adipic acid, succinic acid, azaleic acid, phthalic acid, isophthalic acid, terephthalic acid, chlorendic acid, tetrabromophthalic acid and the like, and the corresponding anhydrides where such anhydrides exist. Also, long chain dimer acids may be used to form useful polyols by esterification with polyols, especially diols such as ethylene glycol and the like.

Another useful class of polyols are polycaprolactone polyols, which are reaction products of diols or polyols and epsilon-caprolactone in selected molar ratios. Likewise, among the polyols which can be employed are the trialkanolamines which, by reaction with alkylene oxides, form adducts which are useful in the invention herein. Illustrative of the lower molecular weight trialkanolamines include triethanolamine, triisopropanolamine and tributanolamine. The alkylene oxide adducts which can be employed are preferably those wherein the oxyalkylene moieties thereof have from 2 to 4 carbon atoms.

Still another useful class of polyols which can be employed are the alkylene oxide adducts of mono- and polyamines and also ammonia. These may be termed aminic polyols.

The mono- and polyamines are preferably reacted with alkylene oxides which have 2 to 4 carbon atoms, for example, ethylene oxide; 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 16-hexanediamine phenylenediamines, toluenediamine, naphthalenediamines and the like. Among the compounds of the above groups which are of particular interest are, among others, N,N,N',N'-tetrakis(2 - hydroxyethyl)ethylenediamine; N, N,N',N'-tetrakis(2 - hydroxypropyl)ethylenediamine; N, N,N',N'-pentakis(2 - hydroxypropyl)diethylenetriamine; phenyldiisopropanolamine and higher alkylene oxide adducts of aniline, and the like. Others which deserve particular mention are the alkylene oxide adducts of aniline or substituted aniline/formaldehyde condensation products. Active hydrogen-containing monomeric materials such as acrylic monomers are likewise useful.

Acrylic monomers which may be employed include those containing reactive hydrogen atoms such as hydroxyalkyl esters of ethylenically unsaturated acids. The preferred hydroxyalkyl esters are esters of acrylic acid, methacrylic acid, and other alpha, beta-ethylenically unsaturated carboxylic acids. Examples include 3-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 4-hydroxybutyl methacrylate, and corresponding esters of other unsaturated acids including ethacrylic acid, crotonic acid, and similar acids of up to about 6 carbon atoms. There may also be employed mono- or diesters of unsaturated dicarboxylic acids such as maleic acid, fumaric acid, and itaconic acid in which at least one of the esterifying groups contain a hydroxyl group. Examples of such esters include mono(2-hydroxyethyl) maleate, mono(2-hydroxyethyl)fumarate, bis(2-hydroxyethyl)maleate, mono(2-hydroxypropyl)maleate, bis(2 - hydroxypropyl)maleate, mono(2-hydroxyethyl) itaconate, bis(2-hydroxyethyl) itaconate, and 2-hydroxyethylbutyl maleate.

Likewise acrylic polymers which contain active hydrogen atoms, such as the hydrogen on —OH or —COOH, radicals may be utilized as they are capable of reacting with the diisocyanate-diketimine or dialdimine adduct. The polymers may contain one or more groups containing reactive hydrogen atoms. The location of the reactive hydrogen atom is not critical but it is preferred that the hydrogen atom be connected to a hetero atom such as oxygen and in some instances a nitrogen or sulfur atom.

Examples of these polymers include those derived from polymerizing a polymerizable ester of an organic or inorganic acid, a polymerizable hydroxyalkyl ester of acrylic or methacrylic acid and optionally at least one other ethylenically unsaturated monomer.

In addition, compounds containing primary and/or secondary amine groups can be employed to react with the diisocyanate-ketimine or aldimine adducts herein. Preferably the compounds (including mixtures of compounds, generally referred to as organic resinous material) should have molecular weights of from about 1000 to 10,000.

Suitable compounds having available amine groups are the polyamide resins which may have terminal reactive primary amine groups and/or reactive secondary amine groups spaced along their molecules.

Polyamide resins may be produced by a condensation reaction between dimerized fatty acids, such as dimerized linoleic acid, with lower aliphatic polyamines, such as, for example, ethylenediamine or diethylenetriamine, so that the final product will have available amine groups. The more highly functional amines, such as, diethylenetriamine, are preferred because the polyamide resins produced by a condensation reaction between a dimerized fatty acid and diethylene triamine provide resins having lower melting points and having free amine groups spaced along the polymer.

Another class of amine group-containing resins which can be used are products made by reacting free carboxyl groups of a polycarboxylic acid group containing acrylic resins with an alkylenimine or substituted alkylenimine.

Likewise, numerous other carboxylic, hydroxyl and amino-containing monomers are useful and can readily be employed in the present invention.

After the organic active hydrogen-containing material is added to the adduct, described hereinabove, these components are heated to provide the polyketimines and polyaldimines of the present invention. To prepare the polyketimes or polyaldimine herein temperatures of about 200° F. may be utilized. Generally, the molar ratio of the NCO-containing adduct to the active hydrogen-containing material is from about 1:1 to about 1:3, however, various other ratios may be employed where desirable.

Another method by which to prepare the polyketimines or polyaldimines of the present invention is to first react the diisocyanate with the organic active hydrogen-containing material and subsequently reacting the product with a diketimine or dialdimine (see Example III infra). However, much longer reacting times are required and typically higher viscosities are obtained, or a catalyst is required and subsequent blends with polyisocyanate crosslinking agents have shorter workable pot-lives.

The polyketimines or polyaldimines of this invention can readily be employed as curing agents for epoxy resins as well as various other useful purposes.

As mentioned hereinabove these polyketimines or polyaldimines may be cured by the addition of a crosslinking agent. Such compositions can be moisture-cured, moisture and heat-cured or heat-cured depending on the properties desired and the particular substrate employed.

Suitable crosslinking agents include organic polyisocyanates which can be blended or admixed with the polyketimines or polyaldimines herein.

Crosslinking agents such as hydrocarbon polyisocyanates, isocyanato-terminated prepolymers, or any other organic compound containing isocyanato groups may readily be employed.

Among the hydrocarbon polyisocyanates that can be utilize are aromatic, aliphatic and cycloaliphatic diisocyanates and triisocyanates as well as combinations of these types. Representative and preferred hydrocarbon diisocyanates include those disclosed hereinabove. The polyisocyanates may contain other substituents, although those which are free from reactive groups other than isocyanato groups are ordinarily preferred. Dimers and trimers of monomeric diisocyanates and di(isocyanato aryl) ureas, such as di(3-isocyanato-4-methylphenyl)urea, may also be used.

Particularly useful organic polyisocyanates are the so-called "prepolymers" in which a polyisocyanate is modified by partial reaction with a polyhydroxy compound or other compound having two or more active hydrogen atoms to provide an isocyanato-terminated product. Such products are more easily handled and are preferably employed in the compositions herein. The organic polyisocyanates used to prepare such prepolymers include any of the various compounds mentioned above, which can be reacted with essentially any polyfunctional active hydrogen-containing compound. Preferred prepolymers are made by reaction of a polyol with an organic diisocyanate, such as toluene diisocyanate. Monomeric polyols can be employed as modifiers, as can polyester polyols and polyether polyols described hereinabove.

Prepolymers made from polyester polyols and polyether polyols are well known in the art and are extensively utilized in the manufacture of polyurethanes.

For purposes of this invention it is preferred to employ isocyanato-terminated adducts of toluene diisocyanate or isophorone diisocyanate and a polyester polyol, polycaprolactone polyol or polyether polyol.

Generally, the amount of the organic polyisocyanate may vary somewhat and may be blended or admixed with the polyketimine or polyaldimine in such a manner as to provide a ratio of NCO to polyketimine from 0.5:1.0 to 2:1.0, however, the preferred molar ratio is about 1.1:1.0.

These compositions provide for suitable coatings as well as other useful purposes. Compositions such as these may be pigmented if desired by pigmenting the diketimine or dialdimine component, as well as the polyisocyanate portions.

Such pigments include titanium dioxide, carbon black, talc, barytes, zinc sulfate, strontium chromate, barium chromate, ferric iron oxide, as well as color pigments, such as cadmium yellow, cadmium red, toluidine red, hydrated iron oxide and the like may be added to any desired color and to enhance the film properties. The desired pigment composition is ground in accordance with well-known practice. In addition, dispersing agents or surface active agents may be incorporated into the pigment composition as can wetting agents, flow agents, fungicides, antioxidants, ultraviolet adsorbers and the like.

The compositions of this invention may be applied by techniques well known in the art such as reverse and direct roll coating, air spray, electrostatic spray, dipping, flow coating and the like.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE I

Into a reactor equipped with a thermometer, a reflux condenser, dropping funnel and a mechanical stirrer, the following parts were changed.

| | Parts by wt. |
|---|---|
| Isophorone diisocyanate (2-moles) | 444 |
| Cellosolve acetate | 964 |

These two components were heated to 100° F. and then 520 parts diethylene triamine methyl isobutyl ketone diketimine (2-moles) were added in a dropwise manner over a period of about 20 minutes while maintaining the temperature below 110° F. After allowing the reaction to continue for about ½ hour, 360 parts of an epsilon-caprolacetone-trimethylolpropane triol polyester (M.W. of 540) in 360 parts of Cellosolve acetate were added and the contents were heated to 200° F. for over a one-hour period. The reactants were maintained at a temperature of from about 200° to 190° F. for 3 hours. Thereafter the polyketimine polymer was cooled. The diisocyanatediketimine adduct prior to the addition of the polyester was analyzed by gel permeation chromatography to contain only 1.8 percent free isophorone diisocyanate based on the weight of total solids content.

The polyketimine polymer obtained had the following properties:

Amine equivalent (theoretical—662) _____ 721
Solids content (percent) analyzed (theoretical—50%) _____ 45.0
Viscosity (Gardner-Holdt) _____ L—
Color (Gardner) _____ 4–5
(Reaction time 5 hours)

EXAMPLE II

This example was prepared in a similar manner to that of Example I except that the following proportions were employed: 555 parts (5 eq.) isophorone diisocyanate, 780 parts diethylene-triamine methyl isobutyl ketone diketimine (3 eq. of NH) 360 parts of an epsilon-caprolactone-trimethylol propane triol polyester (2 eq. of OH) and 1701 parts Cellosolve acetate.

The polyketimine polymer provided had the following characteristics:

Free isophorone diisocyanate (percent)—prior to the addition of the polyester triol _____ 21.0
Solids content (percent)—analyzed _____ 42.2
Viscosity (Gardner-Holdt) _____ H–I
Color (Gardner) _____ 3
Amine equivalent (theoretical—566) _____ 540

EXAMPLE III

Example III was prepared in a manner similar to Example I except that the following proportions were employed: 999 parts (9 eq.) of isophorone diisocyanate, 1560 parts (6 eq.) of diethylenetriamine methyl isobutyl ketone diketimine, 795 parts (3 eq.) of an epsilon-caprolactone diethylene glycol addition product, wherein the ratio of lactone units to molecules of glycol is 3.7 to 1.0, and 1116 parts of urethane grade Cellosolve acetate. The product provided by this example had the following characteristics:

Amine equivalent (theoretical—373) _____ 367
Solids content (percent) (theoretical—75%) _____ 64.7
Viscosity (Gardner-Holdt) _____ Z–Z1
Color (Gardner) _____ 3–4

EXAMPLE IV

In this example a diketimine was prepared from diethylenetriamine and diisopropyl ketone in the following manner. Charge into a reactor equipped with a stirrer, thermometer, Dean-Stark trap, inert gas inlet, condenser and heating mantle, 412 parts of diethylene-triamine (8 eq.) and 1368 parts (12 eq.) of diisopropyl ketone. Heat to azeotropically remove 139 g. of water at a temperature of about 123° C. to 142° C. over a period of about 24 hours. The product provided had a viscosity (Gardner-Holdt) of less than A, theoretical active diketimine of 72.1 percent, weight per gallon of 6.93 and a color of 7 (Gardner). This ketimine solution was used in the following polyketimine preparation.

Charge into a reactor as described above, 218 parts of 2,4-toluene diisocyanate (2.5 eq.) and 525 parts of Cellosolve acetate. Heat to 100° F. and add 511 parts (1.25 moles) of the ketimine solution (above) over a period of about 15 minutes. Cooling may be required to keep the temperature at about 100° F. Then add dropwise a mixture of 225 parts (1.25 eq.) of epsilon-caprolactone-trimethylolpropane triol polyester (molecular weight about 540) dissolved in 225 parts of Cellosolve acetate. The solution is then heated to 200° F. and held there until the infrared spectrogram shows substantially no unreacted isocyanate absorption. The polyketimine provided had the following characteristics:

Weight/gallon _____lbs.__ 8.33
Solids content (percent) analyzed (theoretical 47.3%) _____ 39.2
Viscosity (Gardner-Holdt) _____ L–M
Color (Gardner) _____ 8
Weight/ketimine group (theoretical) _____parts__ 676

An isocyanate functional intermediate was prepared from 1060 parts (4 eq.) of a diethylene glycol-epsilon-caprolactone addition product diol (molecular weight about 530) in 527 parts of Cellosolve acetate and 522 parts (6 eq.) of 2,4-tolylene diisocyanate. The analyzed weight per isocyanate group was 107 parts. This product was evaluated by mixing 67.6 parts of the polyketimine (above) with 107.0 parts of the isocyanate functional intermediate above. This blend gave an initial viscosity of W (Gardner-Holdt), however, about one hour later the viscosity was Z. Immediately after mixing a film drawn down (3 mils wet) provided a tack-free film after air-drying one hour at room temperature. The film was completely resistant to 50 xylene rubs, very resistant to scratch marks, had 2H pencil hardness and good flexibility.

Several of the foregoing examples were employed in formulating coating compositions which were cured by moisture, moisture plus heat and heat cured.

Examples I, II and III were blended with (a curing agent) isocyanate-polyol prepolymer in such a manner as to provide an NCO/amine ratio of 1.1 to 1.0 (analyzed values). The prepolymer employed was comprised of a polyester polyol made from diethylene glycol and epsilon caprolactone having a ratio of 3.7 lactone units per molecule of glycol, 666 parts isophorone diisocyanate and 570 parts Cellosolve acetate and had the following characteristics:

Solids content (percent) _____ 74.7
Viscosity (Gardner-Holdt) _____ X–Y
Color (Gardner) _____ 1—
Acid number _____ .66
NCO equivalent _____ 1140

The particulars of the film of these three coating compositions are listed in tabular form below:

|  | Composition | | |
| --- | --- | --- | --- |
|  | A | B | C |
|  | Example III plus prepolymer above | Example II plus prepolymer above | Example I plus prepolymer above |
| Amine equivalent | 367 | 540 | 721 |
| Solid content, percent | 64.7 | 42.5 | 45 |

After flashing for four hours and curing for 5 minutes at 80° F. in an atmosphere having a relative humidity of 85 percent, the film provided had the following properties:

| Composition | A | B | C |
| --- | --- | --- | --- |
| Average tensile strength (p.s.i.) | 3,460 | 3,760 | 2,060 |
| Average percent elongation, percent | 435 | 315 | 330 |
| Average film thickness | 2.0 | 1.7–1.8 | 1.6–1.8 |

The film integrity and solvent resistance was evaluated after curing in air for 4 hours and 2 hours, respectively, by rubbing the film with a cheese cloth saturated with methyl isobutyl ketone and the effects were as follows:

| Composition | A | B | C |
|---|---|---|---|
| Cured in air: | | | |
| 4 hours | 50 rubs no effect. | 50 rubs no effect. | 50 rubs dulls film. |
| 2 hours | Slight softening effect. | Slight softening effect. | Dissolves film to substrate. |

Likewise, these compositions had good pot-life stability. Compositions B and C were aged for one week at room temperature then provided films having the following properties:

| Composition | B | C |
|---|---|---|
| Average: | | |
| Tensile strength | 3,560 | 3,680 |
| Percent elongation, percent | 250 | 295 |
| Film thickness | 1.7–1.8 | 1.8 |

Furthermore, these films have good properties when partially moisture cured and partially heat cured. For example when flashed for 2 hours and then baked for 15 minutes at 120° F.

Likewise, these compositions exhibited excellent properties when cured employing a combination of humidity and heat.

After flashing in air for 2 hours and baking for 15 minutes at 120° F. the films produced from the compositions had the following properties:

| Composition | A | B | C |
|---|---|---|---|
| Average: | | | |
| Tensile strength | 3,630 | 4,230 | 1,855 |
| Percent elongation, percent | 330 | 285 | 285 |
| Film thickness | 1.9–2.2 | 1.8–2.0 | 1.8–2.0 |

In addition, compositions A and B were heat-cured by employing a temperature of 120° F. for 15 minutes. The films provided had the following properties:

| Composition | A | B |
|---|---|---|
| Average: | | |
| Tensile strength | 2,530 | 2,800 |
| Percent elongation, percent | 380 | 310 |
| Film thickness | 2–3 | 1.9–2.2 |

Generally, it is believed that an addition type reaction takes place when heat is employed to cure the film and urea is formed when a moisture cure is provided.

In the examples above various other components may be substituted for those employed. Diisocyanates such as p-phenylene diisocyanate, 4-chloro-1,3-phenylene diisocyanate and 4,4'-diphenylene diisocyanate may be readily employed. Other diketimines and dialdimines that may be employed include phenyl acetone ketimine, cyclohexyl methyl ketimine, phenyl acetaldehyde aldimine, cyclohexyl propionaldehyde aldimine and the other like polyols such as trimethylol-propane, pentaerythritol and various diols and hydroxyl-containing polyester resins.

Likewise, the organic polyisocyanate may be a hydrocarbon polyisocyanate such as 2,4-toluene diisocyanate, m-phenylene diisocyanate and the like or other isocyanato-terminated prepolymers.

According to the provisions of the patent statutes, there are described above the invention and what are now considered to be its least embodiments. However, within the scope of the appended claims, it is to be understood that the invention can be practiced otherwise than as specifically described.

We claim:

1. A polyketimine or polyaldimine composition comprising the reaction product of:
    (A) an adduct of
        (1) a diisocyanate, and
        (2) a diketimine or dialdimine of the general formula:

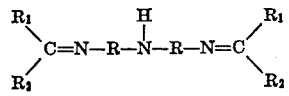

wherein R is an alkylene group of 2 to 6 carbon atoms, and $R_1$ and $R_2$ are hydrogen or organic radicals having 1 to 8 carbon atoms; wherein the molar ratio of (1) to (2) is from about 0.6:1.0 to about 3:2; and
    (B) an organic, active hydrogen-containing, material selected from the group consisting of hydroxyl-containing, carboxyl-containing and amine-containing compounds; wherein the molar ratio of isocyanate groups in (A) to active hydrogens in (B) is from about 1:1 to about 1:3.

2. A composition as in claim 1 wherein the diisocyanate is selected from the group consisting of isophorone diisocyanate or 2,4-toluene diisocyanate.

3. A composition as in claim 1 wherein the organic active hydrogen-containing material is a polyester polyol.

4. A composition as in claim 3 wherein the polyester polyol is a reaction product of epsilon-caprolactone and trimethylol propane.

5. A coating composition comprising:
    (A) a polyketimine or polyaldimine comprising the reaction product of:
        (1) an adduct of:
            (a) a diisocyanate, and
            (b) a diketimine of dialdimine of the general formula:

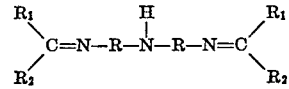

wherein R is an alkylene group of 2 to 6 carbon atoms, and $R_1$ and $R_2$ are hydrogen or organic radicals having 1 to 8 carbon atoms; wherein the molar ratio (a) to (b) is from about 0.6:1 to about 3:2;
        (2) an organic active hydrogen-containing material selected from the group consisting of hydroxyl - containing, carboxyl - containing and amine-containing compounds; wherein the molar ratio of isocyanate groups in (1) to active hydrogens in (2) is from about 1:1 to about 1:3; and
    (B) a crosslinking agent for component (A).

6. A composition as in claim 5 wherein the diisocyanate is selected from the group consisting of isophorone diisocyanate or 2,4-toluene diisocyanate.

7. A composition as in claim 5 wherein organic active hydrogen-containing material is a polyester polyol.

8. A composition as in claim 7 wherein the polyester polyol is a reaction product of epsilon-caprolactone and trimethylol propane.

9. A method of preparing a coating composition which comprises the steps of:
    (A) preparing an adduct by reacting:
        (1) a diisocyanate, and
        (2) a diketimine or dialdimine of the general formula:

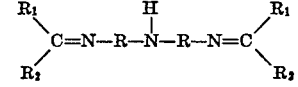

wherein R is an alkylene group of 2 to 6 carbon atoms, and $R_1$ and $R_2$ are hydrogen or organic radicals having 1 to 8 carbon atoms; wherein the molar ratio of (1) to (2) is from about 0.6:1.0 to about 3:2;

(B) reacting said adduct with an organic active hydrogen-containing material selected from the group consisting of hydroxyl-containing, carboxyl-containing and amine-containing compounds; wherein the molar ratio of isocyanate groups in said adduct to active hydrogens in the active hydrogen-containing material is from about 1:1 to about 1:3; and (C) adding a crosslinking agent for the product thus formed.

10. A method as in claim 9, wherein the crosslinking agent is an organic compound containing isocyanato groups.

11. A method as in claim 17 wherein the crosslinking agent is an organic polyisocyanate selected from the group consisting of hydrocarbon polyisocyanates and isocyanato-terminated prepolymers.

12. A method as in claim 11 wherein the organic polyisocyanate is an isophorone diisocyanate-polyol prepolymer wherein the polyol is a polyester polyol of diethylene glycol and epsilon-caprolactone having a ratio of 3.7 lactone units per molecule of glycol.

13. A method as in claim 9 wherein the diisocyanate is selected from the group consisting of isophorone diisocyanate or 2,4-toluene diisocyanate.

14. A method as in claim 9 wherein organic active hydrogen-containing material is a polyester polyol.

15. A method as in claim 14 wherein the polyester polyol is a reaction product of epsilon-caprolactone and trimethylol propane and has a molecular weight of 540.

16. An article of manufacture having thereon a cured layer of the composition of claim 5.

17. A composition as in claim 6 wherein the crosslinking agent is an organic compound containing isocyanato groups.

18. A composition as in claim 17 wherein the crosslinking agent is an organic polyisocyanate selected from the group consisting of hydrocarbon polyisocyanates and isocyanato-terminated prepolymers.

19. A composition as in claim 18 wherein the organic polyisocyanate is an isophorone diisocyanate-polyol prepolymer wherein the polyol is a polyester polyol of diethylene glycol and epsilon-caprolactone having a ratio of 3.7 lactone units per molecule of glycol.

References Cited

UNITED STATES PATENTS

| | | | |
|---|---|---|---|
| 3,493,543 | 2/1970 | Nazy et al. | 260—77.5AM |
| 3,549,569 | 12/1970 | Farah et al. | 260—77.5 AT |
| 3,420,800 | 1/1969 | Haggis | 260—77.5 AM |

M. J. WELSH, Primary Examiner

U.S. Cl. X.R.

260—77.5 AT, 453 AR, 453 AL, 482 B, 482 C